Aug. 12, 1941.  E. S. L. BEALE ET AL  2,251,973
CIRCUITS FOR INTEGRATING AND DIFFERENTIATING ELECTRIC VARIATIONS
Filed March 20, 1936
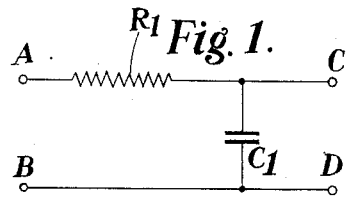
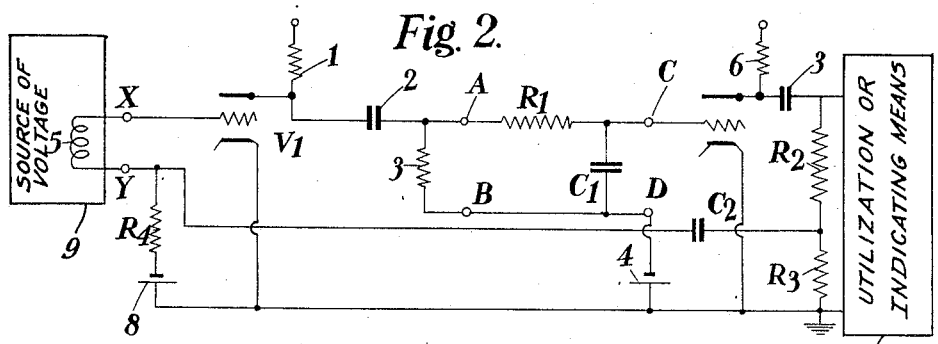
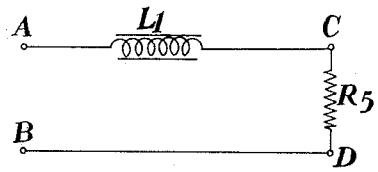
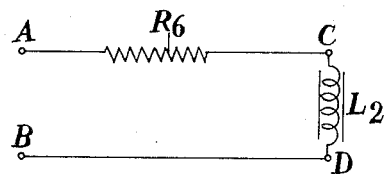
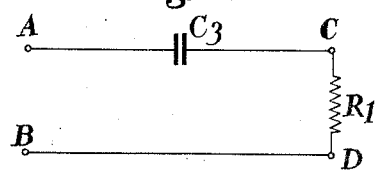
INVENTORS
E.S.L. BEALE AND
R. STANSFIELD
BY
R.C. Hopgood
ATTORNEY Patented Aug. 12, 1941

2,251,973

UNITED STATES PATENT OFFICE 2,251,973

CIRCUITS FOR INTEGRATING AND DIFFERENTIATING ELECTRIC VARIATIONS

Evelyn Stewart Lansdowne Beale, Chelsea, London, and Richard Stansfield, Teddington, England, assignors to International Standard Electric Corporation, New York, N. Y.

Application March 20, 1936, Serial No. 69,808
In Great Britain March 21, 1935

11 Claims. (Cl. 177—351)

This invention relates to apparatus for inter-converting electric variations of a given wave form and electric variations that are a derived function thereof. That is to say the invention relates to apparatus for converting electric variations into other variations that are a differentiation thereof and for carrying out the reverse conversion i. e. an integration.

The integrating and differentiating means are such as may be used in connection with the electrical indication of engine cylinder pressures and other variations such as valve motions, fuel line pressure changes, vibrations of engines and other mechanism and the like.

There are several known methods of indicating and measuring such variations by converting them into electrical variations and by then using the electrical variations to operate an oscillograph to give a visual or photographic indication of the movements or changes. Thus, for example, in the case of engine pressures a diaphragm may be arranged to be flexed in accordance with the cylinder pressure and the movements of the diaphragm may be converted into electrical variations by electromagnetic means or otherwise.

In some cases the electrical variations are suitable to be applied directly to the oscillograph (after amplification as necessary) since the indication is required to have the same dimensions as the voltage derived from the indicator.

An example of this is where a piezo-electric crystal is arranged to be influenced by the gas pressure within an engine cylinder, the potential difference developed across the crystal being proportional to the gas pressure. If therefore an indication of gas pressure is desired, the voltages obtained in this way can be applied, without modification, to an oscillograph. The same is true of the voltage or current changes obtained from other devices such as carbon piles.

In other cases it is desired to indicate a quantity having different dimensions from the voltage derived. Such a case may arise, for example, where a diaphragm influenced by engine pressure moves relatively to an electromagnet as in a telephone receiver and where, if the air gap between the armature and the electromagnet is not allowed to become unduly small, the voltage developed across the coils of the electromagnet is proportional to the rate of change of position (that is the velocity) of the diaphragm and hence to the rate of change of pressure. Here if it be desired to indicate engine pressure, the voltage derived from the coils of the electromagnet must be integrated with respect to time.

Moreover, when using a device of the piezo electric type it may be desired to indicate in the dimensions of mean effective pressure or horsepower and here again integration of the voltage obtained will be necessary.

In other cases it may happen that it is desired to produce a voltage wave which has a form which is the differential of a given wave form. An example of this is where it is desired to indicate movements of a body in the dimensions of velocity and where the detecting unit, that is the device responsive to the movements, is one giving a voltage proportional to the displacement of the body. Such a device may for example be of the piezo-electric or carbon pile type.

It is the principal object of the present invention to provide, for use with indicating devices such as are discussed above, means whereby there can be derived from a given voltage wave, a wave which is substantially a true integration or differentiation of the given wave.

According to the present invention there is provided apparatus for producing from electrical variations of a given wave-form, electrical variations having a wave-form which is an integration or a differentiation of the given wave-form, said apparatus comprising an elementary integrating or differentiating circuit, means for applying voltages to be integrated or differentiated from a device responsive to said variations to the input terminals of said circuit, and means for feeding from the output side of the circuit to the input side thereof a compensating voltage which is in such phase relation and has such amplitude that there are delivered at the output terminals electrical variations having a wave-form which is a substantially true integration or differentiation of the given wave-form.

Preferably a thermionic valve is arranged on the input and output sides of the elementary integrating or differentiating circuit and the feed back is taken from the anode circuit of the later valve to the grid circuit of the earlier valve.

The invention will be described by way of example with reference to the accompanying drawing in which—

Fig. 1 is an explanatory diagram;
Fig. 2 is a circuit diagram of one embodiment of the present invention;
Fig. 3 shows a modified integrating circuit which may be used in place of that in Fig. 2, and
Figs. 4 and 5 show differentiating circuits which may be used in place of the integrating circuit of Fig. 1.

Like parts are indicated by the same references in all the figures.

It is well known that the fact that the rate of change of a pressure or the rate of change of position (or velocity) of a body is proportional to the voltage delivered by a device, such as the telephone receiver above referred to, can be expressed mathematically in the form $$\frac{dP}{dt} = kv$$

where P is the pressure or displacement at any time $t$, $v$ is the voltage and $k$ a constant.

The pressure or displacement at any time $t$ is then given by the equation $P = k\int v\,dt + k_1$, where $k_1$ is an arbitrary constant.

The integration required by this second equation can theoretically be performed on a waveform having a potential $v$ varying with time by applying the voltage $v$ to the input terminals A, B of a network having a resistance $R_1$ and a condenser $C_1$ connected between the input terminals A, B and output terminals C, D as shown in Fig. 1. If the potential $c$ across the condenser $C_1$ can at all times be neglected in comparison with $v$, then the potential difference across the resistance $R_1$ will also be $v$. A current $i$ will therefore flow in the resistance $R_1$, where at any instant $$i = \frac{v}{R_1}$$

If no current is taken from the output terminals C, D, the potential $c$ will at any moment be equal to $$\int \frac{i\,dt}{C_1}$$

Thus $$c = \frac{1}{R_1 C_1} \int v\,dt$$

In other words the potential $c$ is the integrated value of the potential $v$ and is proportional to P as required.

Now in practice it is inconvenient to arrange the values $C_1$ and $R_1$ so that the value of $c$ is always so small as to be negligible compared with $v$. One reason is clearly that it is the value of $c$ which is to be recorded or otherwise used to operate an oscillograph and the above condition is equivalent to a reduction in sensitivity to a negligibly small value.

For the integrating device to be useful, therefore, it is necessary to arrange that the maximum potential difference across the condenser $C_1$ attains a value which is a substantial fraction of the potential $v$, say 10% of the maximum value. In this case the voltage which causes current to flow into the condenser $C_1$ through the resistance $R_1$ is no longer exactly equal to $v$ and $c$ is thus not a true integral of $v$.

Fig. 1 is thus an example of what is referred to in this specification as an elementary integrating circuit. It is capable of true integration only in circumstances which are difficult, if not impossible, of achievement in practice.

Taking, as an example of the effect of using the circuit of Fig. 1 in practice, the voltage which may be developed across an electromagnet coil co-operating with a diaphragm influenced by the pressure within a Diesel engine cylinder, during one cycle this voltage will be found to rise to a positive peak, just beyond top dead centre, to fall fairly rapidly through zero to a negative, less peaked maximum and then to return fairly gradually to zero. If this voltage be applied to the elementary integrating circuit above described, the output voltage, starting at zero, will rise to a lower maximum value than it should and instead of returning to zero at the end of the cycle, it will fall below zero to some negative value.

In Fig. 2 there is shown one form of circuit according to the present invention whereby the above mentioned difficulty can be removed or at least greatly reduced so that a substantially accurate integration can be obtained.

In Fig. 2, the coil 5 or other source of voltage indicated generally by rectangle 9, to be integrated is connected between input terminals X and Y. The terminal X is connected to the grid of a triode valve $V_1$. The anode of this valve is connected through a resistance 1 to a suitable source of potential and through a condenser 2 to one input terminal A of an elementary integrating circuit of the kind shown in Fig. 1. A resistance 3 is connected between input terminals A and B. The terminals B and D are connected through a source 4 of bias potential to earth.

Terminal C is connected to the grid of a second valve $V_2$ having its cathode connected to the cathode of valve $V_1$ and earthed. The anode of the valve $V_2$ is connected to a suitable potential source through a resistance 6 and through a condenser 7 and two resistances $R_2$ and $R_3$ to earth. The potential developed in the output circuit across resistances $R_2$ and $R_3$ may be applied to a utilization means 10. This means may consist of a suitable indicating device or recorder. A bias source, if required for a later stage of amplification, may be inserted between resistances $R_3$ and earth.

The junction of resistances $R_2$ and $R_3$ is connected through a condenser $C_2$ to the input terminal Y. In this way a part of the output potential difference developed across resistances $R_2$ and $R_3$, namely that developed across resistance $R_3$, is fed through condenser $C_2$ to the grid of the first valve. The amount fed back can be adjusted by varying the relative values of $R_2$ and $R_3$. For this purpose if desired $R_3$ and a part of $R_2$ may be arranged as an adjustable potential divider. It will be noted that the feed-back voltage is applied to the grid-cathode circuit of the valve $V_1$ effectively in series with the voltage from coil 5.

Although satisfactory results can be obtained with the circuit above described, instability of the amplifier is liable to arise if the feed-back is adjusted to a value such that complete correction for the errors of the elementary integrating circuit is obtained. To prevent this a resistance $R_4$ is connected in series with a source 8 of bias potential between terminal Y and earth. The combination of $C_2$ and resistance $R_4$ acts somewhat as a high-pass filter section. Thus at high frequencies the impedance of $C_2$ is negligible compared with the resistance $R_4$ so that the resistances $R_4$ and $R_3$ are effectively in parallel, while at very low frequencies the impedance of $C_2$ is very high compared with the resistance $R_4$ so that very low frequency voltages suffer great attenuation, and also, of course, a phase displacement of 90 degrees. Since the elementary integrating circuit produces greater attenuation of the higher frequencies the whole arrangement may in this way be made stable.

It will be noted that since terminals C and D are connected across the grid circuit of the second valve, substantially no current is taken from these terminals. The sense of the voltage fed back as described is such that it adds to the voltage $v$ to be integrated applied to terminals X and Y, so that at any instant the voltage applied to the grid of the first valve is the algebraic sum of the voltage from the coil and the voltage across $R_3$.

By suitably selecting the fraction of the total output voltage which is thus fed back, the potential difference between terminals A and B of the integrating circuit it can be made equal, at any instant, to the algebraic sum of the voltage applied from the coil to A, B and the integrated voltage corresponding thereto. In other words the potential across A, B is at all times increased by the potential difference $c$ across the condenser $C_1$ so that the effect of this potential difference $c$ is removed.

There are also a number of secondary effects due to imperfections of components which have an analogous effect to that produced by the voltage $c$ upon the integrated voltage. For example the condenser $C_1$ should be of good quality, for example with mica dielectric, but even then its imperfections may be apparent in the integrated voltage. Further if the coupling condenser between the anode of the first valve and the terminal A has a paper dielectric and if the resistance between terminals A and B has too low a value a similar distortion of the integrated voltage may take place. Such distortions can also be corrected, at least to a large extent, by suitable selection of the voltage fed back.

In one example of the circuit above described using valves having an effective magnification factor of 20 the following values for components have been found satisfactory:

The condenser $C_1$ may be of 0.1 microfarad, the resistances $R_1$ and $R_2$ of 1 megohm, $R_3$ 2,500 ohms and $R_4$ 10,000 ohms. The feed-back condenser $C_2$ may be of 25 microfarads capacity and the resistance between terminals A and B of 5 megohms.

The voltage obtained from resistances $R_2$ and $R_3$ as above described has the dimensions of pressure or displacement if the input voltage has the dimensions of rate of change of pressure or velocity. Clearly the voltage so obtained can be subjected to a second stage of integration by means of a second circuit similar to that described. In the particular case of indicating cylinder pressure the resulting voltage would correspond to the mean effective pressure. In order to obtain the correct base in terms of piston displacement, any known or suitable means of either mechanical or electrical type may be employed to short circuit the second integrating circuit when the diagram has been completed for the engine cycle under examination and to reverse the sense of the voltage applied to the input terminals of the integrating circuit exactly at top dead centre.

Moreover where a single integrating stage is used to obtain from a voltage (developed by a piezo-electric crystal for example) proportional to cylinder pressure a voltage proportional to mean effective pressure, mechanical or electrical means for leaking away or short circuiting the charge on the condenser $C_1$ may be caused to operate between the successive engine cycles or at any other desired intervals.

In place of the elementary integrating circuit shown in Fig. 2 between terminals A, B and C, D there may be used the electrically equivalent circuit shown in Fig. 3 where the resistance $R_1$ is replaced by an inductance $L_1$ and the condenser $C_1$ is replaced by a resistance $R_5$. Other more complex integrating circuits may also be used.

In the application of the present invention to differentiation, the elementary integrating circuit of Fig. 2 may be replaced by either of the elementary differentiating circuits shown in Figs. 4 and 5. The circuit of Fig. 4 comprises a series resistance $R_6$ and a shunt inductance $L_2$ whilst that of Fig. 5 comprises a series condenser $C_3$ and a shunt resistance $R_7$. In the case where the circuit of Fig. 4 is used in the circuit of Fig. 2, the feed-back through condenser $C_2$ serves to compensate for the voltage $c$ across the inductance $L_2$. When this has been done, the current $i$ through the resistance $R_6$ in response to a voltage $v$ applied to terminals A, B is represented by $$i = \frac{v}{R_6}$$

Assuming that no current is taken from terminals C, D the potential $c$ across the inductance $L_2$ will be equal to $$L_2 \frac{di}{dt}$$

which is also equal to $$\frac{L_2}{R_6} \frac{dv}{dt}$$

so that the output voltage will truly represent the differential of the input voltage.

In order to stabilise the differentiating circuit, an inductance may be arranged in series between condenser $C_2$ and the upper terminal of resistance $R_4$. The condenser $C_2$ is made of large value so that its impedance is relatively negligible. Thus, in effect, the condenser $C_2$ is, in the case of the differentiating circuit, replaced by an inductance. The attenuation of higher frequencies in the feed-back circuit is much greater than that of lower frequencies and in the elementary differentiating circuit the attenuation of lower frequencies is much greater than that of high frequencies. The arrangement can therefore be made stable. The possibility of disturbing resonance occurring between the condenser and inductance of the feed-back circuit can be avoided by making the condenser sufficiently large so that the resonant frequency is very low.

In the particular example of suitable values of components above given, the condenser $C_1$ of the integrating circuit may be replaced by an inductance $L_2$ of 200 henrys which should preferably be of the constant inductance type with an air gap in the magnetic circuit and should have a resistance of not more than about 1000 ohms.

It will be understood that the invention may be used with many other forms of responsive device than those described and may be used to indicate other varying quantities. For instance, in addition to the measurement of cylinder pressures or fuel line pressures by means of a flexible diaphragm or section of the containing vessel, it may also be applied to the measurement of the actual motion of a moving part such as a spray valve, this part or a magnetic extension of it acting in a similar manner to the diaphragm previously described.

It may further be applied to the examination of the relative vibratory or other displacement between two bodies, to indicating changes in thickness along the length of moving parts such for example as textile threads or metal wire and for many other purposes. In its broadest aspect, the invention is applicable to any purpose where variations having a wave-form which is the integral or differential of given variations are required. Further the integrated voltage obtained may be used in any desired manner for example to give a visible diagram or to produce a record upon a photo-sensitive surface. For many purposes a cathode ray oscillograph is found to be a convenient device for this purpose.

What is claimed is:

1. Apparatus for interconverting electrical potential variations and potential variations that are their derived function, comprising an elementary circuit, including a resistance element and a reactance element for producing the desired conversion of the electric potential variations applied thereto when no current is taken from the circuit, said circuit having an input and an output side, means for applying electric variations to the input side thereof, means for applying a potential derived from the output side thereof to a device for utilising the said potential, and a circuit comprising resistance means for feeding from the output side of said circuit to the input side thereof a voltage in positive phase and of such amplitude as to compensate for the errors arising due to the flow of current from said output side.

2. Apparatus for producing electric potential variations, that are the integrated value of electric potential variations from a given source, comprising an elementary integrating circuit comprising a condenser and an impedance having an input and an output side, means for applying electric potential variations to the input side of said circuit, means connected to the said output side of said circuit for utilising the potential variations, and means for feeding back from the said output side to the said input side a voltage in positive phase and of such value as to compensate in a desired degree for the practical departure in said circuit from the theoretical integrated value of the variations applied to said input side.

3. Apparatus for interconverting electrical potential variations and variations that are a derived function thereof, comprising a first electron discharge device, an input and an output circuit for said first electron discharge device, means for applying electric potential variations to be converted to the input circuit thereof, a circuit for theoretically performing the desired conversion connected to the output circuit of said first electron discharge device, a second electron discharge device, connected to said circuit for performing the conversion, input and output circuits for said second electron discharge device, means for feeding back from said output circuit of said second electron discharge device to said input circuit of said first electron discharge device a voltage in positive phase of such value as to compensate in a desired degree for the practical departure from the theoretical converted values of said electrical variations, and means connected to the output circuit of said second electron discharge device for utilising electrical variations therein.

4. Apparatus for interconverting electrical potential variations and electrical variations that are a derived function thereof, comprising a first electron discharge device having an input and an output circuit, means for applying electrical potential variations to be converted to the input circuit thereof, a second electron discharge device having an input and an output circuit, a circuit connected between the output circuit of the first electron discharge device and the input circuit of the second electron discharge device for theoretically performing the desired conversion, a resistance in the output circuit of the second electron discharge device, a condenser, means for connecting through said condenser a part of said resistance in series with the input circuit of the first electron discharge device whereby a voltage in positive phase is fed back, and means for utilising potential variations across part of said resistance.

5. Apparatus for producing electrical variations that are an integral of electrical potential variations of given wave form, comprising a first electron discharge device having an input and an output circuit, means for applying electrical variations to be integrated to the input circuit thereof, a second electron discharge device having an input and an output circuit, a circuit for theoretically performing the desired integration, connected between the output circuit of the first electron discharge device and the input circuit of the second electron discharge device, a resistance in the output circuit of the second electron discharge device, a condenser, means for connecting through said condenser a part of said resistance in series with the input circuit of the first electron discharge device to feed back a voltage in positive phase, and means for utilising potential variations across part of said resistance.

6. Apparatus for producing electrical variations that are an integral of electrical potential variations of given wave form, comprising a first electron discharge device having an input and an output circuit, means for applying electrical variations to be integrated to the input circuit thereof, a second electron discharge device having an input and an output circuit, a circuit for theoretically performing the desired integration, connected between the output circuit of the first electron discharge device and the input circuit of the second electron discharge device, a feed-back path connected between the output circuit of the second electron discharge device and the input circuit of the first electron discharge device for feeding back a voltage in positive phase, means in said feed-back path for attenuating lower frequencies more than higher frequencies, and means for utilising electrical variations in the output circuit of said second electron discharge device.

7. Apparatus for producing electrical variations that are a derived function of electrical potential variations of given wave form, comprising a first electron discharge device having an input and an output circuit, means for applying electrical potential variations to be differentiated to the input circuit thereof, a second electron discharge device having an input and an output circuit, a circuit for theoretically performing the desired differentiation, connected between the output circuit of the first electron discharge device and the input circuit of the second electron discharge device, a feed-back path connected between the output circuit of the second electron discharge device and the input circuit of the first electron discharge device for feeding back a voltage in positive phase, means in said feedback path for attenuating higher frequencies more than lower frequencies, and means for utilising electrical variations in the output circuit of said second electron discharge device.

8. Apparatus for producing electrical variations that are an integral of electrical potential variations of given wave form, comprising a first electron discharge device having an input and an output circuit, means for applying electrical variations to be integrated to the input circuit thereof, a second electron discharge device having an input and an output circuit, a connection between the output circuit of the first electron discharge device and the input circuit of the second electron discharge device including a resistance in series and a condenser in shunt, a feed-back path connected between the output circuit of the second electron discharge device and the input circuit of the first electron discharge device for feeding back a voltage in positive phase, means in said feed back path for attenuating lower frequencies more than higher frequencies, and means for utilising electrical variations in the output circuit of said second electron discharge device.

9. Apparatus for producing electrical variations that are an integral of electrical potential variations of given wave form, comprising a first electron discharge device having an input and an output circuit, means for applying electrical potential variations to be integrated to the input circuit thereof, a second electron discharge device having an input and an output circuit, a connection between the output circuit of the first electron discharge device and the input circuit of the second electron discharge device including an inductance in series and a resistance in shunt, a feed back path connected between the output circuit of the second electron discharge device and the input circuit of the first electron discharge device for feeding back a voltage in positive phase, means in said feed back path for attenuating lower frequencies more than higher frequencies, and means for utilising electrical variations in the output circuit of said second electron discharge device.

10. Apparatus for producing electrical variations that are a derived function of electrical potential variations of given wave form, comprising a first electron discharge device having an input and an output circuit, means for applying electrical variations to be differentiated to the input circuit thereof, a second electron discharge device having an input and an output circuit, a connection between the output circuit of the first electron discharge device and the input circuit of the second electron discharge device including a resistance in series and an inductance in shunt, a feed-back path connected between the output circuit of the second electron discharge device and the input circuit of the first electron discharge device for feeding back a voltage in positive phase, means in said feedback path for attenuating higher frequencies more than lower frequencies, and means for utilising electrical variations in the output circuit of said second electron discharge device.

11. Apparatus for producing electrical variations that are a derived function of electrical potential variations of given wave form, comprising a first electron discharge device having an input and an output circuit, means for applying electrical variations to be differentiated to the input circuit thereof, a connection between the output circuit of the first electron discharge device and the input circuit of the second electron discharge device including a condenser in series and a resistance in shunt, a feed-back path connected between the output circuit of the second electron discharge device and the input circuit of the first electron discharge device for feeding back a voltage in positive phase, means in said feed-back path for attenuating higher frequencies more than lower frequencies, and means for utilising electrical variations in the output circuit of said second electron discharge device.

EVELYN STEWART LANSDOWNE BEALE.
RICHARD STANSFIELD.